United States Patent [19]

DeFrasne et al.

[11] Patent Number: 5,603,629
[45] Date of Patent: Feb. 18, 1997

[54] BOARD CONNECTOR, IN PARTICULAR FOR ELECTRONIC BOARD

[75] Inventors: Andre DeFrasne, Pontarlier; Michel Pernet, Doubs, both of France

[73] Assignee: Framatome Connectors International, Paris, France

[21] Appl. No.: 267,217

[22] Filed: Jul. 6, 1994

[30] Foreign Application Priority Data

Jul. 8, 1993 [FR] France .................. 93 08397

[51] Int. Cl.⁶ .................................... H01R 13/62
[52] U.S. Cl. .......................... 439/331; 439/326
[58] Field of Search .................... 439/326, 327, 439/328, 329, 330, 331, 629, 630, 631–636; 200/51.1, 51.09

[56] References Cited

U.S. PATENT DOCUMENTS

| | | | |
|---|---|---|---|
| 3,701,071 | 10/1972 | Landman | 439/492 |
| 4,602,351 | 7/1986 | Shimamura et al. | 439/326 |
| 4,717,346 | 1/1988 | Yoshizaki | 439/331 |
| 4,743,746 | 5/1988 | Murschall et al. | 439/326 |
| 4,902,233 | 2/1990 | Maillot | 439/630 |
| 4,944,690 | 7/1990 | Imai | 439/492 |
| 5,013,255 | 5/1991 | Juret et al. | 439/630 |
| 5,109,980 | 5/1992 | Matsuoka et al. | 439/331 |
| 5,320,552 | 6/1994 | Reichardt et al. | 439/331 |

FOREIGN PATENT DOCUMENTS 520080 12/1992 European Pat. Off. .
3445185 12/1986 Germany .

*Primary Examiner*—Hien Yu
*Attorney, Agent, or Firm*—Pollock, Vande Sande & Priddy

[57] ABSTRACT

A board connector for an "miniboard" IC cards, including a planar base incorporating electrical contact elements having first ends extending beyond the front and rear edges of the base, and second ends projecting above its upper surface. A cover housing an IC card is pivotably hinged to the base and contains insertion slide tracks for the card. The base and the cover include corresponding latching elements to keep them in closed card-connection position. These latching elements are disconnected by applying pressure on an edge of the cover parallel to its axis of pivoting.

9 Claims, 2 Drawing Sheets

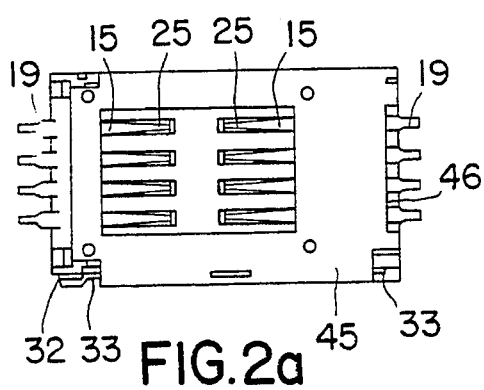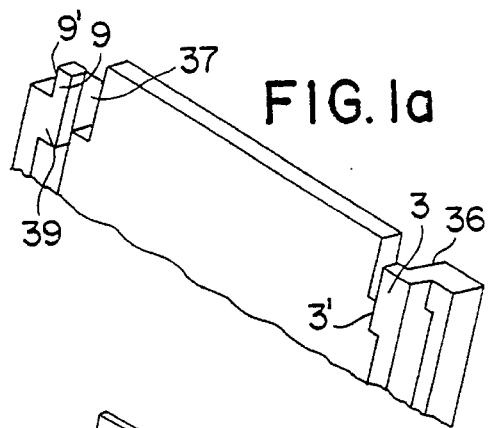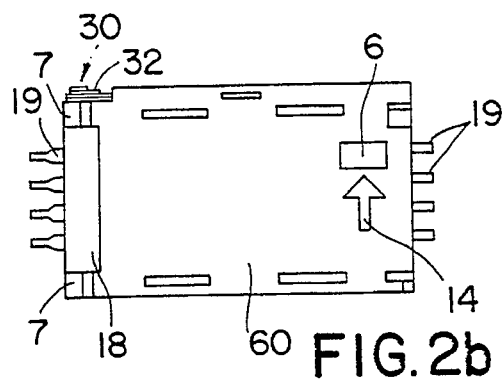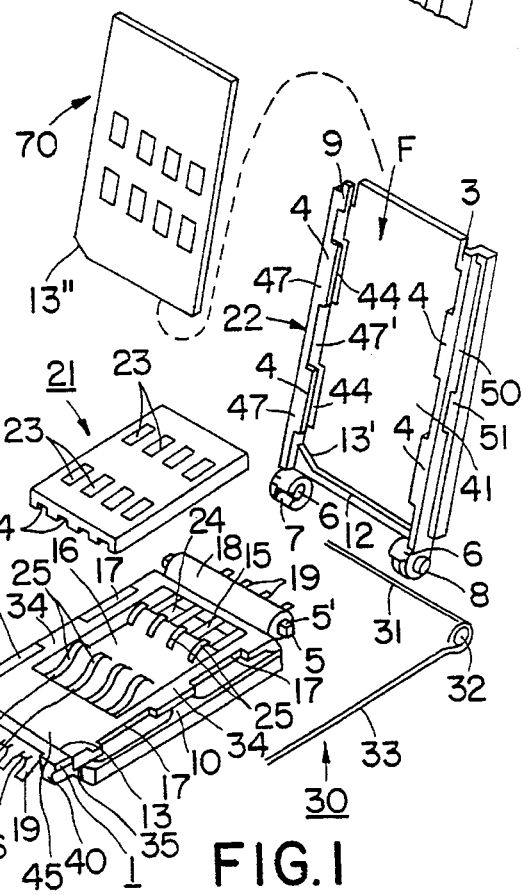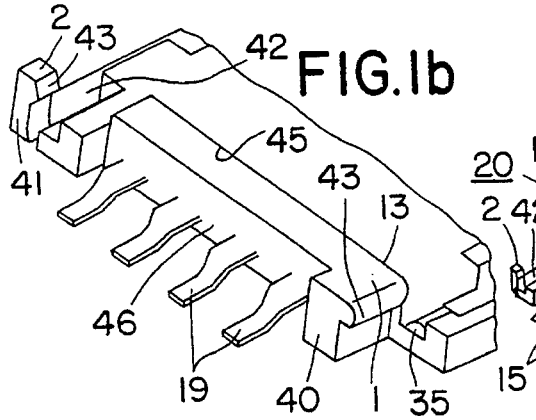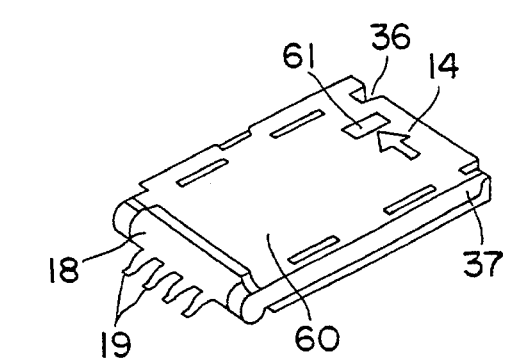

5,603,629

BOARD CONNECTOR, IN PARTICULAR FOR ELECTRONIC BOARD

FIELD OF THE INVENTION

The present invention concerns a board connector, in particular for an IC card and, more specifically, for a miniboard incorporating chips.

SUMMARY OF THE INVENTION

The substantial growth of chip-incorporating cards has led to the marketing of small cards, termed miniboards.

The invention is intended to produce a connector usable, most notably, in conjunction with these cards and making it possible to connect them easily, while allowing their insertion and removal.

To this end, the invention proposes a card connector characterized by virtue of the fact that it comprises:

- a generally planar base incorporating, electrical contact elements having a first end which extends beyond at least one edge of the base, and a second end extending beyond an upper surface of the base; and, a first hinge element;
- a cover housing the card and incorporating insertion slide-tracks located beneath the lower plane of the cover, as well as a second hinge element complementary to the first hinge element, the first and second hinge elements forming a hinge around an axis of rotation.

The base and the cover incorporate first and second corresponding latching elements, respectively facing the first and second hinge elements so as to keep the base and the cover in the closed card-connection position.

The connector advantageously comprises a cover-opening spring having a first arm lodged in the hinge and a second arm inserted in a groove in the cover or base.

The groove advantageously adjoins one of the insertion slide-tracks.

The slide-tracks may be substantially perpendicular to the axis of rotation, so that the direction of insertion is perpendicular to the axis of rotation.

According to a preferred embodiment, the first and second latching elements can be disconnected by exerting a pressure stress substantially parallel to the axis of rotation. In particular, the cover may be made deformable so as to allow this disconnection.

The second latching elements are advantageously incorporated into the insertion slide-tracks.

In this case, the base may act as a stop for the card and is located in the vicinity of the first latching element and between the latter and the first hinge element. This arrangement ensures that, when the cover is closed over the base, the card is released from the area in which the latching action is effected, thereby allowing the card to be repositioned with precision, the stop advantageously being a ramp inclined in relation to the direction of insertion F of the board.

The first and second latching elements may be lugs which interpenetrate, the first and/or second latching elements incorporating a bevel facilitating insertion.

BRIEF DESCRIPTION OF THE DRAWINGS

Other features and advantages of the invention will emerge more fully from a reading of the following description, provided with respect to the drawings, in which:

FIG. 1 is an exploded perspective view of a connector according to a preferred embodiment of the invention, comprising two enlarged detail views showing with greater precision the mechanism latching the cover on the base;

FIGS. 2a and 2b are top plan views of the base and the connector, respectively, closed on each other;

FIGS. 3a and 3b respectively illustrate the connector in open position as seen in perspective from the front, and the connector in closed position as seen in rear.

DETAILED DESCRIPTION

Figure 4A:
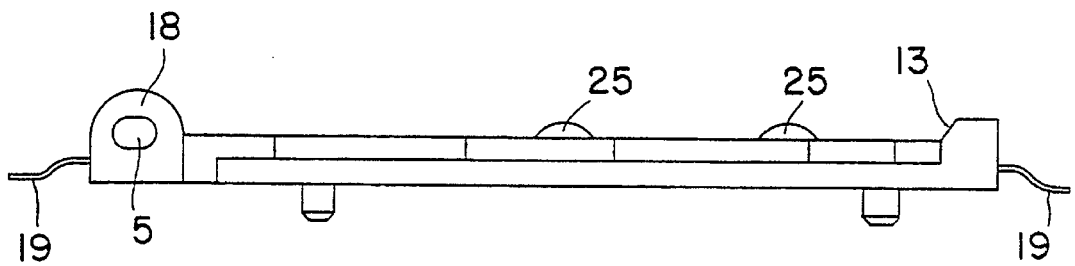
FIGS. 4a and 4b are side and top views, respectively, of the connector base.
Figure 4B:
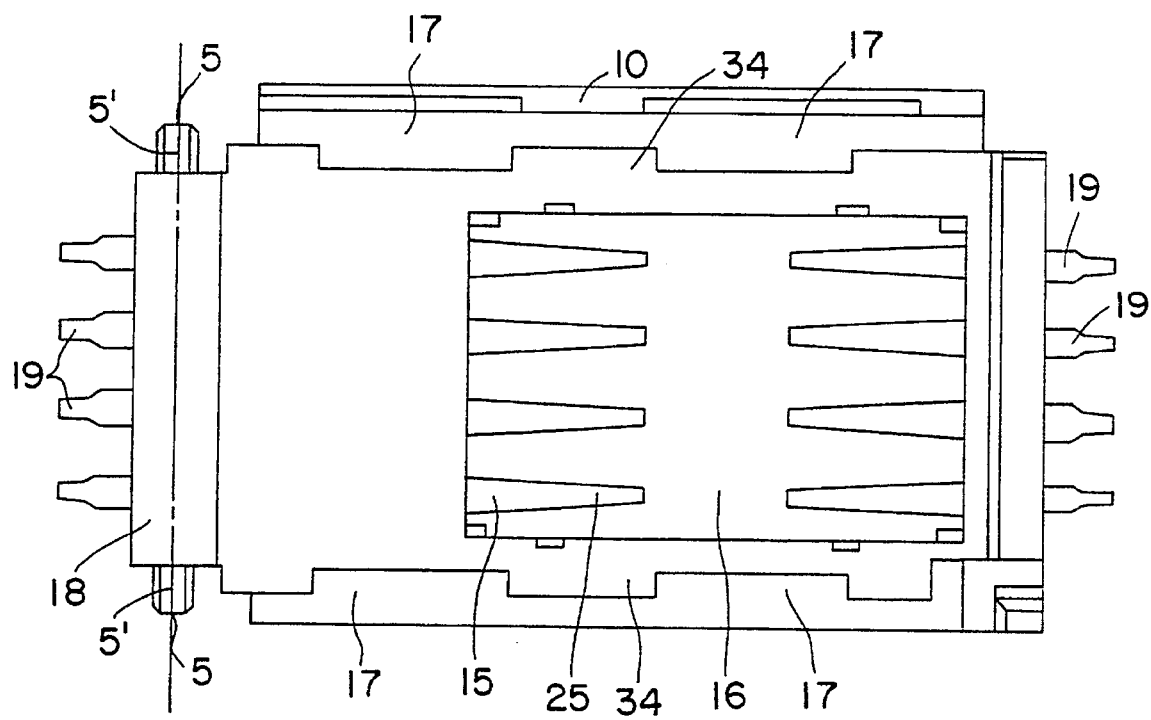

FIG. 1 and FIGS. 4a and 4b illustrate a base 20 comprising contact studs 15 forming contact elements molded within the mass of the base. Each contact stud 15 comprises an end 19 which extends beyond a longitudinal edge 46 of the base and another, curved end 25 projecting above the upper surface 45 of the base 20. The ends 25 are arranged in a substantially rectangular opening 16 providing vertical clearance. In the vicinity of the longitudinal ends, the opening 16 forms a bottom allowing position-retention of a contact-protection plate 21, which comprises openings 23 through which the curved sections 25 project. The lower part of plate 21 incorporates longitudinal grooves 24 receiving the flat portions of the contact studs 15 positioned between the curved section 25 and the body of the contact-bearing base 20.

The drawings show two rows of four conductors 15 which are arranged opposite each other and spaced apart longitudinally, and whose ends 19 extend beyond the base 20 across the opposite longitudinal edges 46.

The upper part of one of these edges 46 is bordered by a portion of a cylinder 18 whose ends are extended by semi-cylindrical pins 5, each of which incorporates two flats 5' and forms a first hinge element. The other longitudinal edge 46 has, at each of its ends, lateral lugs 1, 2 incorporating bevels 43 for insertion.

The lug 1 is part of an extension 40 perpendicular to the direction of insertion F of the card 70, which has, on its rear part, an inclined surface 13 whose function will be explained below.

Beneath its lower surface 41, the cover 22 incorporates two longitudinal slide-tracks 4 located near its longitudinal edges, so as to guide the card in the grooves 44. Each slide-track 4 comprises three section, i.e., two sections 47 spaced apart from each other at 47', and, at one longitudinal end, a section 3 intended for one of the slide-tracks and a section 9 for the other slide-track, these sections forming notches or lugs designed to cooperate with the lugs 1 and 2, respectively. The rear part of cover 22 incorporates a stop 12 fitted at one of its ends with an inclined section 13'.

At the end opposite the sections 36 and 39, the cover has two cylindrical recessed housings 6, each of which has an opening 7. One of these housings is extended outward by a pin 8 designed to fit into the spiral-shaped central loop of a spring 30 having a first arm 31 housed between the cylindrical part 18 and the body of the cover 22, and a second arm 33 inserted in a groove 50 adjoining one of the slide-tracks 4 in which it is held in place, in particular by a section 51 extending inward. In a variant, the arm 31 may be housed in the cover 22 in the vicinity of the housings 6 and of the arm 33, in a groove 35 in the base 20.

Assembly and disassembly of the cover 22 are effected when the flats 5 are positioned in the axis of the openings 7, a position in which the cover 22 is perpendicular to the base 20. This position is achieved by exerting force on the opening spring 30, which, in the normal opened position shown in FIG. 3a, brings the cover 22 into a position forming an angle of approximately 45° with the base 20.

The cover 22 is latched in place on the base 20 when the lateral lugs 1 and 2 on the base 20 engage the notches in the lugs 3 and 9, which form part of the slide-tracks 4 by means of which the card is inserted in the cover.

The connector then functions as follows. The card 70 is inserted in the slide-tracks 4 until it rests against the stop 12 located in the immediate vicinity of the cylindrical housings 6. The card comprises a chamfered section 13" which comes to rest on the inclined surface 13' forming a polarizing slide. In the event the card is inserted in a wrong direction, the inclined section 13' is stopped against the straight end of the card and prevents its complete insertion, thereby preventing the cover 22 from closing. The cover 22 is folded down over the base 20 by rotating it about axis X—X (FIG. 4b), and closure is effected by elastic deformation of the cover 22, produced in particular by the bevels 43 which push back the inner surface 3' and the outer surface 9' of the lugs 3 and 9, and/or by the presence of lateral play in the hinges.

Unlatching occurs by exerting pressure in the direction of the arrow 14 (FIG. 3b) and by lateral deformation of the cover 22, so as to release the lugs 1 and 2, thereby allowing the cover 22 to open under the action of the spring 30. Opening the device thus requires only a lateral pressure stress which, in the aforementioned example, is perpendicular to the direction of insertion F of the card 70. To facilitate disconnection, the upper surface 60 of the cover 22 may incorporate a fingerhold depression 61.

Upon closing of the cover 22, if the card is not in contact with the stop 12, the inclined surface 13 forces the stop backward in order to position it correctly. When the latching action is completed, the median areas 34 are arranged in the recesses 47' separating the sections 47, so as to press the card down toward the lower surface 41 of the cover 22, while the sections 47 become lodged at 17 in the base 20. Similarly, the end section 39 is housed at 42 in the vicinity of the lug 2, while the longitudinal edge 50 closes off the groove 35. This edge has an area of discontinuity 51 which is filled by the section 10 extending inward.

We claim:

1. An IC card connector comprising:
   (a) a generally planar base comprising electrical contact elements having first ends which extend beyond front and rear edges of said base and second ends which projects above an upper surface of said base, and a first hinge means located beyond said rear edge of said base;
   (b) a cover attached to said first hinge means for housing an IC card and comprising insertion slide-tracks formed integrally with said cover and located adjacent opposite edges of a lower surface of said cover, as well as second hinge means thereon engaging in said first hinge means, said first and second hinge means forming a hinge around an axis of rotation of said cover;
   (c) said base and said cover comprising first and second corresponding latching elements respectively located opposite said first and second hinge means so as to keep said base and said cover in a closed card-connection position, said first and second latching elements being disconnected by application of pressure on an edge of said cover substantially parallel to said axis of rotation of said cover, said cover being this displaceable to allow disconnection of said first and second latching elements.

2. The connector according to claim 1, wherein said connector comprises a spring for opening the cover, said spring comprising a first arm housed in said first hinge element and a second arm housed in a groove located in the base.

3. The connector according to claim 1, wherein said connector comprises a spring for opening the cover, said spring comprising a first arm housed in said first hinge element and a second arm housed in a groove located in the base in said cover.

4. The connector according to claim 2 or 3, wherein said groove adjoins one of said insertion slide-tracks.

5. The connector according to claim 1, wherein said slide-tracks are substantially perpendicular to said axis of rotation.

6. The connector according to claim 1, wherein the base has a stop intended for the card located in the vicinity of a first latching element and between said first latching element and the first hinge element.

7. The connector according to claim 6, wherein said stop is a surface inclined in relation to a direction of insertion of the card.

8. The connector according to claim 1, wherein the first and second latching elements are interpenetrating lugs.

9. The connector according to claim 8, wherein at least one of said first and second latching elements has a bevel facilitating insertion.

* * * * *